(12) United States Patent
Zhou

(10) Patent No.: US 6,490,393 B1
(45) Date of Patent: Dec. 3, 2002

(54) INTEGRATED OPTICAL MULTIPLEXER AND DEMULTIPLEXER FOR WAVELENGTH DIVISION TRANSMISSION OF INFORMATION

(75) Inventor: Zhiping (James) Zhou, Marietta, GA (US)

(73) Assignee: Advanced Interfaces, LLC, Atlanta, GA (US)

( * ) Notice: Subject to any disclaimer, the term of this patent is extended or adjusted under 35 U.S.C. 154(b) by 222 days.

(21) Appl. No.: 09/722,989

(22) Filed: Nov. 27, 2000

(51) Int. Cl.⁷ .............................. G02B 6/34; G02B 6/28
(52) U.S. Cl. ............................. 385/37; 385/14; 385/24; 359/571
(58) Field of Search ............................. 385/14, 37, 24; 359/130, 566, 568–571

(56) References Cited

U.S. PATENT DOCUMENTS

| | | | |
|---|---|---|---|
| 4,011,009 A | | 3/1977 | Lama et al. ............. 350/162 R |
| 4,335,933 A | * | 6/1982 | Palmer ...................... 359/127 |
| 4,343,532 A | * | 8/1982 | Palmer ...................... 359/127 |
| 4,484,072 A | | 11/1984 | Matsumura ................. 250/237 |
| 4,760,569 A | * | 7/1988 | Mahlein ..................... 359/114 |
| 4,763,969 A | | 8/1988 | Khoe et al. ............... 350/96.19 |
| 4,923,271 A | | 5/1990 | Henry et al. ............. 350/96.19 |
| 4,994,664 A | | 2/1991 | Veldkamp ................... 250/216 |
| 5,033,816 A | | 7/1991 | Blondeau et al. ....... 350/162.22 |
| 5,070,488 A | | 12/1991 | Fukushima et al. ....... 360/44.12 |
| 5,074,646 A | | 12/1991 | Huang et al. ............... 359/572 |
| 5,099,114 A | | 3/1992 | Matsumoto et al. ... 250/227.23 |

(List continued on next page.)

FOREIGN PATENT DOCUMENTS

| EP | 0347563 | 12/1989 | ............ H04J/15/00 |
|---|---|---|---|
| WO | WO 0242821 A1 * | 3/2002 | ............ G02B/6/43 |

OTHER PUBLICATIONS

Haidner et al., "Dielectric binary blazed gratings", Applied Optics, Aug. 1993, vol. 32, No. 22, pp. 4276–7278.*

Farn, "Binary gratings with increased efficiency", Applied Optics, Aug. 1992, vol. 31, No. 22, pp. 4453–4458.*

Advertisement from Applied Optics, Optical Society of America entitled "Dielectric Binary Blazed Gratings", (Aug. 1, 1993).

Advertisement from Applied Optics, Optical Society of America entitled "Binary Gratings with Increased Efficiency", (Aug. 1, 1992).

*Primary Examiner*—Akm E. Ullah
*Assistant Examiner*—Michelle R. Connelly-Cushwa
(74) *Attorney, Agent, or Firm*—Womble Carlyle Sandridge & Rice, PLLC

(57) ABSTRACT

A multiplexer/demultiplexer is provided for optical interconnection between electronic components on an integrated circuit chip. The multiplexer/demultiplexer includes a substrate formed with an array of photo emitters/detectors and conditioning electronics coupled thereto. A first layer of optically transparent material is formed on the substrate overlying the emitters/detectors and a second layer of optically transparent material, functioning as an optical waveguide, is formed on the first layer. A binary blazed grating is formed at the interface of the two layers. For multiplexing, discrete wavelength optical signals are modulated with data, emitted by the emitters, intercepted by the binary blazed grating, and multiplexed into a polychromatic beam for transmission through the waveguide. For demultiplexing, the discrete wavelengths are separated by the binary blazed grating and directed to corresponding detectors. The conditioning electronics receive and demodulate the output of the detectors to extract data, and format the data for communication with electronic components.

18 Claims, 1 Drawing Sheet

U.S. PATENT DOCUMENTS

| | | | |
|---|---|---|---|
| 5,113,067 A | | 5/1992 | Nakai et al. ............. 250/208.1 |
| 5,119,454 A | * | 6/1992 | McMahon .................. 359/290 |
| 5,223,703 A | | 6/1993 | Setani ..................... 250/208.1 |
| 5,276,745 A | | 1/1994 | Revelli, Jr. .................. 385/14 |
| 5,345,444 A | | 9/1994 | Cloonan et al. .............. 370/60 |
| 5,362,957 A | | 11/1994 | Nakai et al. ............. 250/208.1 |
| 5,377,044 A | | 12/1994 | Tomono et al. ............. 359/566 |
| 5,434,426 A | | 7/1995 | Furuyama et al. .......... 250/551 |
| 5,457,760 A | | 10/1995 | Mizrahi ....................... 385/37 |
| 5,481,381 A | | 1/1996 | Fujimoto ................... 358/505 |
| 5,506,676 A | | 4/1996 | Hendler et al. ............. 356/237 |
| 5,559,912 A | * | 9/1996 | Agahi et al. ................ 359/115 |
| 5,566,024 A | | 10/1996 | Rauch ........................ 359/571 |
| 5,568,574 A | * | 10/1996 | Tanguay et al. .............. 359/15 |
| 5,615,024 A | | 3/1997 | May et al. .................... 349/57 |
| 5,682,266 A | | 10/1997 | Meyers ....................... 359/571 |
| 5,684,308 A | | 11/1997 | Lovejoy et al. ............. 257/184 |
| 5,730,888 A | | 3/1998 | Byron ......................... 216/24 |
| 5,731,874 A | * | 3/1998 | Maluf ........................ 356/326 |
| 5,740,292 A | | 4/1998 | Strasser ....................... 385/37 |
| 5,742,433 A | | 4/1998 | Shiono et al. ............... 359/575 |
| 5,760,937 A | | 6/1998 | Ishikawa et al. ............ 359/135 |
| 5,818,986 A | | 10/1998 | Asawa et al. ................. 385/24 |
| 5,825,520 A | | 10/1998 | Huber ........................ 359/130 |
| 5,856,961 A | | 1/1999 | Brazas et al. ............ 369/44.23 |
| 5,959,747 A | | 9/1999 | Psaltis et al. ................. 359/22 |
| 5,963,684 A | | 10/1999 | Ford et al. .................... 385/24 |
| 6,011,884 A | | 1/2000 | Dueck et al. ................. 385/24 |
| 6,011,885 A | | 1/2000 | Dempewolf et al. .......... 385/34 |
| 6,118,561 A | | 9/2000 | Maki ......................... 359/124 |
| 6,198,864 B1 | * | 3/2001 | Lemoff et al. .............. 359/124 |
| 2002/0041734 A1 | * | 4/2002 | Worchesky et al. ........... 385/37 |

* cited by examiner

INTEGRATED OPTICAL MULTIPLEXER AND DEMULTIPLEXER FOR WAVELENGTH DIVISION TRANSMISSION OF INFORMATION

TECHNICAL FIELD

This invention relates generally to wavelength division optical transmission of information and more particularly to wavelength division optical multiplexers and demultiplexers for use in optical transmission systems.

BACKGROUND

Wavelength division multiplexing (WDM) is a valuable technique for increasing the information carrying capacity of optical transmissions for voice communications as well as high density transmission of data. In essence, WDM involves modulating light beams of multiple discrete wavelengths with information to be transmitted, combining or multiplexing the beams into a single polychromatic light beam, and transmitting the polychromatic beam to a receiving location by means, for example, of optical fibers or waveguides. At the receiving location, the beam is demultiplexed or separated back into its component discrete wavelength beams, each of which may then be demodulated to extract the information carried by the beam. Thus, many channels of information can be transmitted simultaneously thereby multiplying the information carrying capacity of the transmission.

Wavelength division optical transmission requires an optical multiplexer for combining individual optical signals into a multiplexed signal and an optical demultiplexer for separating the multiplexed signal back into its discrete wavelength components. A variety of optical multiplexers and demultiplexers have been developed for this purpose, many of which for use in the telecommunications industry. Some of these devices make use of optical gratings because such gratings inherently diffract and/or reflect light beams of different wavelengths at different angles. For example, U.S. Pat. No. 6,011,884 of Dueck et al. discloses an optical wavelength division multiplexer that integrates an axial gradient refractive index element with a diffraction grating. Enhanced efficiency multiplexing of discrete wavelength optical beams into a single polychromatic beam for transmission is asserted. U.S. Pat. No. 4,923,271 of Henry et al. discloses an optical multiplexer/demultiplexer having a plurality of focusing Bragg reflectors, each including a plurality of confocal elliptical grating lines. U.S. Pat. No. 5,818,986 of Asawa et al. discloses a optical wavelength demultiplexer incorporating angular back reflection from a series of Bragg gratings in the optical signal path to separate a polychromatic optical beam into its constituent wavelengths. Devices such as these generally are used in the telecommunications industry for the transmission of voice and similar signals over optical communications networks. The size of such devices generally is not an issue in the telecommunications industry and, thus, optical multiplexers and demultiplexers such as those disclosed in the above patents and others tend to be relatively large and bulky.

The past four decades have been a time during which microelectronics, including the integrated circuit chip, has advanced at exponential rates. Microelectronics has entered into almost all aspects of human life through the invention of small electronic devices such as watches, hearing aids, implantable cardiac pacemakers, pocket calculators, and personal computers. The advance of microelectronics has become the principal driving force of innovation in modern information technologies and high-density data communications such as fiber communications, global satellite communications, cellular phones, the Internet, and the World Wide Web. As microelectronics techniques advance, nano-electronics (feature scales on the order of $10^{-9}$ meters) are being realized.

Based on the current growth rate of data communication traffic, the microelectronic chip of 2010 likely will be an array of parallel processors consisting of at least 1024 channels with processing speeds of 40 Giga bytes per second (Gb/s) or faster for each channel. This pushes semiconductor technology towards gigascale and terascale integration with smaller component or feature sizes and larger chip sizes. At the same time, interconnections between circuit components on the chip must support the data transfer rates of 40 Gb/s or faster. As integrated circuit feature sizes continue to decrease and chip sizes to increase, interconnections formed of conventional electrical interconnects and switching technology are rapidly becoming a critical issue in the realization of microelectronic systems. It is believed that the maximum length of interconnection required for a chip is proportional to one half of the square root of the chip area. This parameter thus will be approximately constant while the circuit feature size and required interconnection data throughput scales down. As a consequence, the interconnection delay will be kept approximately constant while device delay is reduced as feature sizes are scaled down. The interconnection delay can even increase if chip size is scaled up. At some point in this scaling process, interconnection delay will dominate system speed; i.e. system speed will not be able to track increasing device speed performance due to the interconnection delay. Conventional conductor and semiconductor interconnects are not able to sustain the required future data rates of 40 Gb/s or higher. Thus conventional interconnects between features on future chips will be an insurmountable bottleneck to the throughput of high-density data communication systems and will be unworkable in future high-speed microelectronics.

To handle the unprecedented growth of data and telecommunications traffic, many novel transmission mechanisms have been proposed, including 3D structures with multiple levels of transistors and conventional interconnects, wireless RF interconnections using co-planar waveguides and capacitive couplers to obtain a "micro-area network on a chip," and on chip optical interconnections. Of these proposals, optical interconnections, which has proven itself in large scale telecommunications networks, appears to hold the most promise. This is due to a number of factors including the fact that the propagation speed of an optical signal is independent of the number of electronic components that receive the signal, the fact that optical interconnections do not suffer mutual interference effects, and that optical interconnect paths can cross each other without significant interaction. As a result, optical interconnections between microchip features promises to enhance communication performance by providing larger fan-outs at higher bandwidths.

There are two major challenges to the introduction of optical interconnections to microelectronic data communication systems such as computer chips. First, the optical systems and the electronic systems have different architectures since they operate under different physical principals. Second, optical component technology on a micro- or nano-optical scale necessary for implementation of on-chip optical interconnects is not mature and it is costly. Thus, the key to successful application of optical interconnections to high-density microelectronic systems is to perform very effective integration of exceedingly small but highly efficient optical devices with increasingly smaller microelectronic circuitry components.

In order to maximize the potential of micro-optical interconnects for data communications, wavelength division multiplexing of multiple optical signals on a micro- or nano-scale will be employed just as it has been on a macro scale in the telecommunications industry. This requirement calls for exceedingly small optical multiplexers and demultiplexers for combining and separating discrete wavelength optical signals. Further, due to power and heat dissipation constraints present in a microelectronic circuit environment, these micro-optical multiplexers and demultiplexers must operate with virtually no optical transmission losses, otherwise the data throughput will be compromised. Finally, the micro-optical multiplexers and demultiplexers must be highly integrated with micro-optical transmitters for generating the optical signals to be multiplexed and transmitted and with micro-optical sensors or detectors for receiving demultiplexed optical signals. In addition, related interface circuitry will be required for transforming electronic signals from microcircuit components into optical signals and vice versa for integrating optical interconnection components with electronic CMOS microcircuit components, all on a micro- or nano-scale.

One type of optical diffraction grating capable of separating a multiplexed polychromatic optical signal into its constituent component beams with virtually no transmission loss is known as a blazed grating. Blazed gratings on a macroscopic scale are known and need not be described in detail here. U.S. Pat. No. 4,359,373 of Hammer, and U.S. Pat. No. 5,279,924 of Sakai et al. disclose and discuss blazed gratings in substantial detail and their disclosures are hereby incorporated fully by reference. Generally, however, a blazed grating is a type of diffraction grating characterized by an asymmetric groove structure wherein adjacent ridges are substantially triangular in cross section, forming an array of microprisms. Blazed gratings are extremely efficient and can be designed to divert or allocate nearly 100% of the power of an incident optical beam into a single diffracted order such as, for example, the +1 order. When an incident beam is a multiplexed polychromatic beam, each discrete wavelength component beam within the incident beam is diffracted at a different angle and thus the component beams are fanned out and separated, resulting in-demultiplexing of the incident beam. Optical sensors can be positioned to intercept the discrete beams for detection and demodulation of data they carry. Since nearly 100% of the incident power is preserved by the blazed grating, the demultiplexing is accomplished with virtually no transmission loss, which translates to higher data throughput with an optical signal of a given power.

While blazed gratings have potential as highly efficient, compact, planar demultiplexers and waveguide couplers, they carry significant inherent problems in that the continuously varying profile of the microprism ridges are difficult and expensive to fabricate. Fabrication becomes an increasing problem as the size and scale of the grating is reduced until, at some threshold, known fabrication techniques such as ion beam etching simply are ineffective to produce the grating. At the micro- or nano-scales required for integrated micro-optical interconnections, no known fabrication technique is available.

Even if exceedingly small scale blazed gratings could be fabricated, there still is an inherent and inescapable practical lower limit to their size for demultiplexing applications. More specifically, as the period of the grating elements in a blazed grating becomes smaller and approaches the wavelength of the incident light, the blazed grating progressively becomes a socalled zero order grating. In other words, when the grating period is extremely small, and certainly when it is smaller than the wavelength of the incident light, i.e. when the period is sub-wavelength, a regular blazed grating allocates all of the transmitted light to the zero defractive order rather than to the first or higher orders. Under such conditions, an incident light beam is not diffracted as it traverses the grating but, instead, passes straight through the grating regardless of its wavelength. However, optical demultiplexing fundamentally requires that light of different wavelengths be diffracted or fanned-out at different angles by a grating so that they are separated. Since a zero order grating passes each wavelength straight through, the different wavelengths are not separated and there is no separating or demultiplexing of a polychromatic optical signal. Thus, regular blazed gratings simply are not functional as optical demultiplexers on the micro- or nano-scale necessary for use in microelectronics data interconnections.

Accordingly, even though regular blazed gratings on a macro scale theoretically offer the performance characteristics necessary for use in integrated micro-optical interconnections, they are in fact not suitable for such applications for a variety of reasons as discussed above.

The performance characteristics of regular blazed gratings can be approached by so-called multi-level gratings wherein the continuously varying sloped surfaces of the grating elements of a regular blazed grating are simulated with multiple discrete surface levels or steps. According to theory, a multi-level grating with 16 levels or steps per grating element can deflect 99% of input beam power to a designated diffractive order. Such a multi-level grating is disclosed in U.S. Pat. No. 5,742,433 of Shiono et al. One problem with multi-level gratings is that multi-step fabrication techniques are required for their manufacture with the number of steps being proportional to the number of levels in the grating features. As a result, the critical alignment of the various levels of each grating element is exceedingly difficult to maintain, especially on the sub-wavelength scales required for microcircuit interconnections. Accordingly, multi-level gratings are not a practical solution to the problems with regular blazed gratings.

Binary blazed gratings have been developed as another alternative to regular blazed gratings. Essentially, a binary blazed grating is a grating in which the grating ridges are all at a single level and the grating troughs are at a single level (i.e. two steps), but the ridge width, trough width, and/or spacing between grating elements varies to create localized subwavelength, submicrometer grating features within the grating period. Fundamental research on the design and optimization of binary blazed gratings has been conducted by the inventor of the present invention and others. This research is presented in Z. Zhou and T. J. Drabik, *Optimized Binary, Phase-only, Diffractive Element with Subwavelength Features for 1.55 μm,* J. Opt. Soc. Am. A/Vol. 12, No. 5/May 1995; and Z. Zhou and N. Hartman, *Binary Blazed Grating for High Efficient Waveguide Coupling,* SPIE Vol. 2891, 1996. The theory and optimization of a binary blazed grating as an alternative to a regular or linear blazed grating is presented in substantial detail in these papers and thus need not be repeated here. Instead, the disclosures of these papers are hereby incorporated by reference as if fully set forth herein.

Binary blazed gratings have been shown to exhibit transmission efficiencies when diffracting light into the first or higher diffractive orders that approaches that of a regular blazed grating. However, binary blazed gratings have several inherent advantages both over regular or linear blazed gratings and over multi-level gratings. Specifically, the subwavelength grating features of a binary blazed grating can be fabricated relatively easily and in a single step with existing fabrication techniques. Further, and most significantly for the present invention, binary blazed gratings do not become zero order gratings at subwavelength scales as do regular blazed gratings. In other words, a binary blazed grating continues to allocate a very high percentage of the power of an incident light beam into the first or a higher diffractive order, even when the grating elements are smaller than the wavelength of the incident beam.

In view of the foregoing, it will be seen that a need exists for an integrated optical multiplexer and demultiplexer for use in wavelength division transmission of information that is downwardly scalable to be incorporated into microelectronic devices as optical interconnections between electronic components. The integration should include signal conditioning circuitry for converting transmitted information between the optical and electronic domains for integration with CMOS circuit components. Further, the multiplexing and demultiplexing functions should be performed with near perfect transmission efficiency similar to that obtainable on a macro scale with a regular blazed grating to preserve optical power, minimize heat generation, and maximize information throughput. It is to the provision of such a device that the present invention is primarily directed.

SUMMARY OF THE INVENTION

Briefly described, the present invention, in a preferred embodiment thereof, comprises an integrated optical demultiplexer (which also can be configured as a multiplexer) for use in wavelength division transmission of information. All of the components of the demultiplexer are formed and integrated on an integrated chip substrate and can be scaled to micro- or nano-scales for use as optical data interconnects between electronic elements of a computer chip such as a microprocessor. In fact, the present invention is uniquely suited for use in nano-electronic circuits. In one embodiment, the integrated optical demultiplexer comprises an integrated circuit substrate, which can be a traditional silicon substrate. An array of optical photo detectors are formed on the substrate using standard integrated circuit etching and doping techniques. Signal conditioning electronics are formed on the substrate and are coupled to receive electrical signals from the photo detectors when they are exposed to light. The signal conditioning electronics are designed to demodulate signals from the photo detectors to extract data from incident light beams on the photo detectors and to convert the data to a format for communication with electronic components.

A first layer of optically transparent material having a first index of refraction is formed on the substrate overlying the photo detectors. A second layer of optically transparent material having a second index of refraction is formed on and overlies the first layer of optically transparent material defining an interface between the two layers of optically transparent material overlying the photo detectors. A binary blazed grating is formed at the interface between the first and second layers of optically transparent material. With this configuration, the second layer of optically transparent material forms an optical waveguide through which light signals can propagate from one place to another. The binary blazed grating forms a waveguide coupler between the waveguide formed by the second layer of optically transparent material and the first layer of optically transparent material, which overlies the array of photo detectors.

In use, a wavelength division multiplexed light beam made up of several discrete wavelength beams each modulated with data to be transmitted is introduced into the optical waveguide formed by the second layer of optically transparent material. Alternatively, such a beam may be introduced into the waveguide directly from another layer overlying the waveguide. This overlying layer may be free space (index of refraction approximately equal to 1) or it may be an optically transparent material with an index of refraction less than that of the waveguide material. In any event (i.e. whether the multiplexed beam is transmitted through the waveguide or arrives from outside the waveguide), when the multiplexed beam encounters the binary blazed grating, the discrete wavelength beams are diffracted by the grating at different angles that are functions of their respective wavelengths. Thus, the multiplexed optical beam is demultiplexed by the binary blazed grating and the discrete wavelength beams are fanned out.

The photo detectors underlying the binary blazed grating beneath the first layer of optically transparent material are positioned such that each photo detector intercepts one of the discrete wavelength beams from the grating. The conditioning electronics coupled to the array of photo detectors receives the resulting signals from the photo detectors, demodulates the signals to extract the data originally encoded into light beam, and formats the data in an appropriate form for communication with electronic components on the integrated circuit.

Since optics is reversible, the invention also contemplates an optical multiplexer for multiplexing discrete wavelength light beams modulated with data into a wavelength division multiplexed optical signal for transmission. In the multiplexer, the photo detectors are replaced with photo emitters for emitting the discrete wavelength light beams and the conditioning electronics functions to reformat data to be transmitted and modulate the data onto light beams emitted by the emitters. Thus, an on-chip micro- or nano-scale optical interconnection network for microelectronic chips is now possible through application of the present invention. The binary blazed grating of the invention can be fabricated on these scales in a one step process with existing fabrication techniques. More importantly, unlike a regular blazed grating, a binary blazed grating does not become a zero-order grating at the required sub-wavelength scales but instead continues to allocate almost all of the incident light into a selected diffractive order such as, for example, the +1 order. Thus, the diffraction and resultant demultiplexing of optical beams is preserved at the required small scales. Finally, since the binary blazed grating is extremely efficient in allocating incident light to the selected diffractive order, a higher intensity optical signal is transmitted to the photo detectors, which respond more quickly as a result. This results in faster data throughputs.

Accordingly, an integrated optical multiplexer and demultiplexer for wavelength division transmission of information that resolves problems with the prior art and this is downwardly scalable for use as optical interconnects between electronic components on an integrated circuit chip. These and other objects, features, and advantages of the invention will become more apparent upon review of the detailed description set forth below when taken in conjunction with the accompanying drawing figure, which is briefly described as follows.

DETAILED DESCRIPTION OF THE PREFERRED EMBODIMENT

Figure 1:
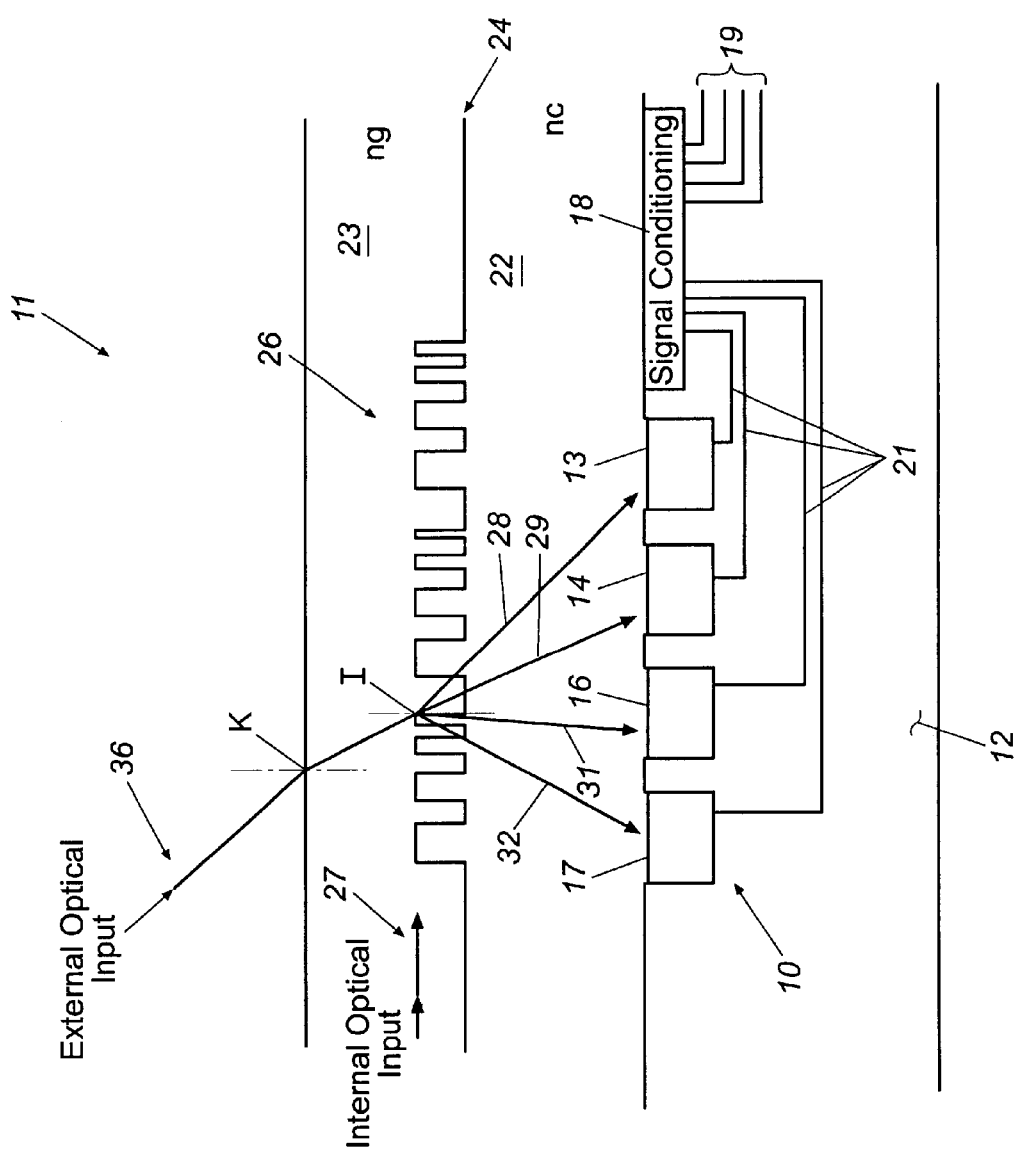
FIG. 1 is a simplified cross-sectional view of an integrated optical multiplexer that embodies principles of the present invention in a preferred form.

Referring now in more detail to the drawing, FIG. 1 illustrates an integrated optical demultiplexer that embodies principles of the invention in a preferred form. It will be understood that the figure includes only the very small section of a micro-electronic integrated circuit that is dedicated to optical demultiplexing and that the complete chip, which may be a microprocessor, may contain millions of integrated electronic components or features hot visible in the small section of FIG. 1.

The integrated optical demultiplexer 11 is formed on an integrated circuit substrate 12, which, conventionally, may be formed of an N type silicon material. Portions of the substrate 12 not visible in FIG. 1 may be etched and doped by traditional integrated circuit fabricating techniques to support millions of electronic features or components that together form, for example, a microprocessor or other electronic device. An array of optical or photo detectors (indicated by reference numeral 10 in FIG. 1) are formed on the substrate 12 by traditional integrated circuit fabricating techniques and may, for example, be comprised of a $P^+$ type doping with appropriate impurities to render the detectors sensitive to light. (Of course, the substrate may be a P type material and the sensors may be an N type material if desired). In the illustrated embodiment, an array of four spaced apart photo detectors made up of a first detector 13, a second detector 14, a third detector 16, and a fourth detector 17 are formed on the substrate. It will be understood, however, that more or fewer than four photo detectors may be formed on the substrate depending on the number of channels of optically transmitted data that are to be received at the location of the sensor array. The array, for instance, might comprise 80 detectors if 80 channels of optical data is to be transmitted. The fabrication of photo detectors on an integrated circuit substrate by appropriate etching, doping, and other techniques is known by those skilled in the art of integrated circuit manufacturing and thus need not be described in detail here.

Signal conditioning electronics 18 are formed on the integrated circuit substrate 12 adjacent the photo detector array and these electronics are electrically coupled to each of the photo detectors in the array by appropriate conductors 21, also formed on or in the integrated circuit substrate 12. The signal conditioning electronics are designed to receive electrical signals produced by the photo detectors 13, 14, 16, and 17 when they are illuminated with a light beam. Characteristically, these electrical signals exhibit spatial and temporal characteristics of the incident light beam including modulations of the light beam that carry data or other information carried by and transmitted with the beam. The signal conditioning electronics 18 performs several functions including, but not limited to, filtering functions to reduce cross-talk between the photo detectors of the array 10, demodulation of the signals from the photo detectors to extract the data from the optical frequency carrier wave, and formatting of the data into a conventional format for subsequent transmission via electrical outputs 19 to other electronic components on the integrated circuit chip.

A first layer of optically transparent (at least at wavelengths of interest) material 22 is formed on the substrate 12 covering and overlying the photo detector array 10. The first layer of optically transparent material has a first index of refraction designated nc in the drawing. The first layer of transparent material 22 may be selected from any of a number of appropriate materials having different indices of refraction including, without limitation, a low K polymer (index of refraction between about 1.2 and 1.3), air or another gas (index of refraction equal to about 1), or silica (index of refraction equal to about 1.5).

A second layer of optically transparent (at least at wavelengths of interest) material 23 is formed on the first layer of optically transparent material 22 and has a second index of refraction designated ng in the drawing. The material from which the second layer of optically transparent material is formed may be selected from any of a number of appropriate materials including, without limitation, $LiNbO_3$ (index of refraction equal to about 2.1), Silicon Nitride (index of refraction equal to about 2), silica (index of refraction equal to about 1.5), a polymer (index of refraction equal to about 1.5 to 1.6), a polysilicon (index of refraction equal to about 4) or silicon (index of refraction equal to about 3.8). Materials with higher indices of refraction allow for a thinner waveguide because of the greater refraction of light through such materials. In application, the materials of the first and second layers of optically transparent materials 22 and 23 are selected such that the corresponding indices of refraction of the two layers are different. An interface 24 is formed between and at the junction of the first and second layers of optically transparent materials 22 and 23. The second layer of optically transparent material 23 forms a waveguide for the transmission of optical signals as discussed in more detail below.

A binary blazed grating 26 is formed at the interface between the first and second layers of optically transparent material according to the principles discussed in detail in the references co-authored by the inventor and incorporated herein by reference above. The grating may be etched, stamped, or otherwise formed on the second layer of optically transparent material if desired, but, more preferably, is formed on the surface of the first layer 22 prior to depositing the second layer 23 thereon. The binary blazed grating 26 essentially forms a waveguide coupler between the waveguide formed by the second layer of optically transparent material 23 and the first layer of optically transparent material 22.

Operation of the optical demultiplexer 11 will now be described in the context of two alternative modes of operation, each of which is equally applicable. First, an internal optical input 27 is transmitted through the waveguide formed by the second layer of material 23 from a remote location on the chip. The optical input comprises a wavelength division multiplexed light beam that is made up, in the illustrated embodiment, of four discrete wavelength light beams combined together into a polychromatic beam. It will be understood that the optical input 27 may be made up of less or more than four discrete wavelength beams if desired depending upon the number of channels of information to be transmitted with the beam. Each of the discrete wavelength light beams has a fundamental frequency that is modulated with data such that the data is encoded in and is transmitted with the multiplexed beam as is known in the art. Thus, in the illustrated embodiment, four channels of data may be transmitted simultaneously with the multiplexed optical input beam 27.

As the wavelength division multiplexed optical input beam 27 encounters the binary blazed grating 26 at I in FIG. 1, the binary blazed grating 26 functions as described above to diffract the beam into the first layer of optically transparent material 22. Since each of the beams that make up the multiplexed beam has a different discrete wavelength, each beam is diffracted at a different angle with respect to a normal to the interface between the two layers as shown. The angles at which the beams are diffracted are a function of the wavelengths of the beams, the construction of the binary blazed grating, and the relative indices of refraction of the materials of the first and second layers of optically transparent material 22 and 23.

In the illustrated embodiment, the diffraction of the discrete wavelength components of the multiplexed beam results in a fanning out of the discrete wavelength beams to separate them into a first, second, third, and fourth discrete wavelength beams 28, 29, 31, and 32 respectively. Thus, the multiplexed beam is demultiplexed or separated into its component beams by the binary blazed grating. Each of the separated beams travels through the first layer of optically transparent material 22 toward a location on the integrated circuit substrate 12. The photo detectors 13, 24, 16, and 17 are arrayed on the substrate such that each one of the photo detectors is positioned to intercept a corresponding one of the demultiplexed light beams as shown. When illuminated by an incident beam, each of the detectors produces an electrical signal having the temporal and spatial characteristics of the beam. Thus, the electrical signal produced includes a carrier at the fundamental wavelength of the beam and the modulations that represent the data modulated or encoded onto the beam. These electrical signals, then, are received by the signal conditioning electronics, filtered, demodulated to extract the data therefrom, and the data is appropriately formatted for communication with other electronic elements on the integrated circuit through electrical outputs 19. Thus, it will be seen that, in the illustrated embodiment, four discrete channels of data are optically transmitted simultaneously, demultiplexed, demodulated, and formatted for subsequent communication with other electronic devices.

The second mode of operation is similar to the first mode just described except that the wavelength division multiplexed optical input 36 enters the second layer of optically transparent material 23 from outside the second layer rather than being transmitted through the waveguide formed by the second layer. In FIG. 1, the optical input 36 enters the second layer from free space. However, it will be understood that a material other than free space may overlie the second layer and the beam may enter the waveguide from this material rather than from free space. In any event, in this mode of operation, the optical input may originate not at a different location on the integrated circuit chip but at a different chip on a circuit board. Alternatively, the optical input may be an optical signal originating from a remote geographic location and transmitted by optical fiber to the chip that embodies the demultiplexer of the present invention. In this regard, the present invention has application to receiving and demultiplexing optical telecommunications signals as well as to on-chip optical interconnections. In fact, optical telecommunications and optical data signals may be transmitted simultaneously and either or both may be transmitted through the waveguide formed by the second layer of material and/or from outside this waveguide.

As the multiplexed optical input 36 enters the second layer of optically transparent material 23 at K in FIG. 1, it is refracted a bit and travels through the second layer to the binary blazed grating 26. Just as with the internal optical input 27, the binary blazed grating demultiplexes the optical input, separating it into is discrete wavelength component beams 28, 29, 31, and 32. These beams are then intercepted by the photo detectors of array 10 and the data carried by the beams extracted and properly formatted by the signal conditioning electronics 18.

Optical systems generally are reversible by nature. Thus, the present invention also contemplates an optical multiplexer for multiplexing data modulated discrete wavelength optical beams into a polychromatic beam for transmission. In the case of optical interconnects on an integrated circuit chip, optical multiplexers may be formed on the chip at locations where data originates and demultiplexers, as described above, may be formed where the data is to be received. The present invention formed as a multiplexer is configured similarly to the demultiplexer of FIG. 1, except that the photo detectors are replaced by photo and preferably laser emitters adapted to emit rather than respond to discrete wavelength light beams. In this regard, many types of laser emitters may be employed such as, for example, Vertical Cavity Edge Emitting Lasers (VCSELs) as well as edge emitting lasers and others. The invention is intended to encompass any type of optical signal generating device, whether now known or hereafter discovered. Integrated circuit substrate compounds appropriate for forming integrated laser emitters include, but are not limited to, GaAs, InP, InGaAs, and InGlGaAs. Generally, techniques for forming laser emitters on an integrated circuit substrate are known in the integrated circuit art and thus need not be discussed in detail here.

In a multiplexer configuration, the signal conditioning electronics receives data at electrical inputs, formats the data for modulation, and produces modulated electrical signals that are applied to the laser emitters. The emitters, in turn, emit discrete wavelength beams that travel through the first layer of optically transparent material and are combined or multiplexed into a wavelength division multiplexed beam by the binary blazed grating. The multiplexed beam is then transmitted through the waveguide formed by the second layer of optically transmitted material and is available for demultiplexing at a demultiplexing location. In this way, complete on-chip optical data and/or telecommunications interconnects are formed and data is transmitted optically rather than electrically, with all the attendant advantages discussed above. The resulting multiplexed beam may also be transmitted into free space for subsequent transmission to other chips or to a remote geographic location through traditional fiber optic cables.

The integrated optical demultiplexer and/or multiplexer of the present invention is possible through use of the binary blazed grating, which, as discussed above, may be fabricated on micro- or nano-scales for incorporation into integrated circuit chips while still retaining its ability to allocate virtually all of the power of an incident light beam into a selected diffractive order. This simply is not possible with regular blazed gratings or other types of diffraction gratings that simulate them.

The invention has been described in terms of preferred embodiments and methodologies. It will be understood by those of skill in the art, however, that many additions, deletions, and modifications may be made to the illustrated embodiments within the scope of the invention. For instance, in its simplest form, the invention might be configured merely as an optical signal detector or switch, in which case the input beams might be of only a single wavelength with a single detector to detect the presence of a beam. Alternatively, a single wavelength beam could be used to encode data in serial fashion rather than modulating the carrier frequency of the input beam to encode data. Finally, materials other than those suggested might also be chosen for the substrate and the layers of optically transparent material, ahd all appropriate materials are considered to be equivalent to those disclosed above. These and other modifications might be made by those of skill in the art without departing from the spirit and scope of the invention as set forth in the claims.

What is claimed is:

1. An integrated optical signal detector for detecting a transmitted optical signal and converting the detected signal to an electrical signal, said detector comprising:
   a silicon integrated circuit substrate;
   at least one photo detector formed on said substrate;
   signal conditioning electronics formed on said substrate;
   said signal conditioning electronics being electrically coupled to said photo detector and being configured to receive signals from said photo detector and to process the received signals into an electrical output;
   a first layer of optically transparent material overlying said substrate, said first layer of optically transparent material having a first index of refraction;
   a second layer of optically transparent material overlying said first layer of optically transparent material, said second layer of optically transparent material having a second index of refraction;
   a binary blazed grating formed at the interface between said first and said second layers of optically transparent material, said binary blazed grating being configured to diffract an incident light beam from said second layer of optically transparent material through said first layer of optically transparent material and onto said photo detector;
   said second layer of optically transparent material forming a waveguide, the integrated optical signal being transmitted at least partially through said waveguide to said binary blazed grating.

2. An integrated optical signal detector as claimed in claim 1 and wherein incident light beam is transmitted from outside of and into said second layer of optically transparent material to said binary blazed grating.

3. An integrated optical signal detector as claimed in claim 1 and wherein the incident light beam is a wavelength multiplexed light beam, said binary blazed grating diffracting each wavelength component of said incident light beam through a different angle and onto a different location on said integrated circuit substrate, and further comprising an array of photo detectors formed on said integrated circuit substrate, each of said photo detectors being positioned to intercept one of said diffracted wavelength components.

4. An integrated optical signal detector as claimed in claim 3 and wherein said binary blazed grating is optimized for the first diffractive order.

5. An integrated optical signal detector as claimed in claim 1 and wherein said first layer of optically transparent material is selected from a group consisting of a low-k polymer, air, or silica.

6. An integrated optical signal detector as claimed in claim 5 and wherein said second layer of optically transparent material is selected from a group consisting of LiNbO₃, silicon nitride, silica, a polymer, silicon, or polysilicon.

7. An integrated circuit optical demultiplexer for wavelength division transmission of information, said demultiplexer comprising:
   an integrated circuit substrate;
   an array of optical detectors formed on said integrated circuit substrate;
   signal conditioning electronics formed on said integrated circuit substrate and coupled to said array of optical detectors;
   a first layer of optically transparent material on said substrate overlying said array of optical detectors, said first layer of optically transparent material having a first index of refraction;
   a second layer of optically transparent material overlying and forming an interface with said first layer of optically transparent material and having a second index of refraction;
   said second layer of optically transparent material being selected from a group consisting of LiNbO₃, silicon nitride, silica, a polymer, silicon, or polysilicon;
   a binary blazed grating formed at the interface between said first and said second layers of optically transparent materials;
   said binary blazed grating being positioned and configured to diffract the discrete wavelength components of a wavelength division multiplexed light beam from said second layer of optically transparent material through said first layer of optically transparent material and onto respective ones of said photo detectors.

8. An integrated circuit optical demultiplexer as claimed in claim 7 and wherein said signal conditioning electronics includes a demodulator for extracting data modulated onto said discrete wavelength components of said wavelength division multiplexed light beam.

9. An integrated circuit optical demultiplexer as claimed in claim 8 and wherein said signal conditioning electronics includes a formatter for formatting the extracted data for communication to other electronic components.

10. An integrated optical demultiplexer as claimed in claim 7 and wherein said first index of refraction is greater than said second index of refraction.

11. An integrated optical demultiplexer as claimed in claim 7 and wherein said first optically transparent material is a low-k polymer.

12. An integrated optical demultiplexer as claimed in claim 7 and wherein said first optically transparent material is air.

13. An integrated optical demultiplexer as claimed in claim 7 and wherein said first optically transparent material is silica.

14. An integrated optical demultiplexer as claimed in claim 7 and wherein said second layer of optically transparent material forms a waveguide and wherein said incident beam is transmitted through said waveguide to said binary blazed grating.

15. An integrated optical demultiplexer as claimed in claim 7 and wherein said incident beam is transmitted from free space into said second layer of optically transparent material.

16. An integrated circuit optical multiplexer for combining light beams of discrete wavelength into a single polychromatic beam for wavelength division multiplexed transmission of information, said multiplexer comprising:
   an integrated circuit substrate;
   an array of optical emitters formed on said integrated circuit substrate, each of said optical emitters for emitting one of said light beams of discrete wavelengths;
   signal conditioning electronics formed on said integrated circuit substrate and coupled to said array of optical emitters;
   a first layer of optically transparent material on said substrate overlying said array of optical emitters, said first layer of optically transparent material having a first index of refraction;
   a second layer of optically transparent material overlying and forming an interface with said first layer of optically transparent material, said second layer of optically transparent material having a second index of refraction and forming an optical waveguide overlying said first layer of optically transparent material for transmitting multiplexed optical signals; and a binary blazed grating formed at the interface between said first and said second layers of optically transparent materials;

said binary blazed grating being positioned and configured to intercept said light beams of discrete wavelength and to combine said light beams into a single polychromatic light beam for transmission.

17. An integrated circuit having optical data interconnects, said integrated circuit comprising:

an integrated circuit substrate;

electronic components formed on said integrated circuit substrate;

a first layer of optically transparent material overlying at least a portion of said substrate and having a first index of refraction;

a second layer of optically transparent material overlying said first layer of optically transparent material and having a second index of refraction, said second layer of optically transparent material forming a waveguide;

a binary blazed grating at an interface of said first and second layers of optically transparent material for demultiplexing the wavelength division multiplexed optical signals into their discrete wavelength components;

photo detectors on said integrated circuit substrate for intercepting and detecting the demultiplexed discrete wavelength components; and signal conditioning electronics on said integrated circuit substrate coupled to said photo detectors for converting the output of said photo detectors to electrical signals for communication with said electronic components.

18. An integrated circuit having optical data interconnects as claimed in claim 17 and further comprising optical emitters on said integrated circuit substrate and encoders coupled to said optical emitters for encoding electrical signals into optical signals, and a binary blazed grating for receiving optical signals from said emitters and combining them into a wavelength division multiplexed signal for transmission through said optical waveguide.

* * * * *